(12) United States Patent
Georgiadis

(10) Patent No.: US 10,053,029 B2
(45) Date of Patent: Aug. 21, 2018

(54) MOUNTING DEVICE AND METHOD FOR VISUAL COMMUNICATION

(71) Applicant: Francois Georgiadis, New York, NY (US)

(72) Inventor: Francois Georgiadis, New York, NY (US)

( * ) Notice: Subject to any disclaimer, the term of this patent is extended or adjusted under 35 U.S.C. 154(b) by 0 days.

(21) Appl. No.: 15/000,008

(22) Filed: Jan. 18, 2016

(65) Prior Publication Data

US 2016/0207478 A1 Jul. 21, 2016

Related U.S. Application Data

(60) Provisional application No. 62/105,014, filed on Jan. 19, 2015.

(51) Int. Cl.
*G09F 7/00* (2006.01)
*B60R 13/10* (2006.01)
*B60R 13/00* (2006.01)
*G09F 21/04* (2006.01)
*G09F 7/18* (2006.01)

(52) U.S. Cl.
CPC .......... *B60R 13/105* (2013.01); *B60R 13/005* (2013.01); *G09F 21/048* (2013.01); *G09F 2007/1895* (2013.01)

(58) Field of Classification Search
CPC .............................. B60R 13/105; G09F 21/04
USPC .................................................... 40/209, 210
See application file for complete search history.

(56) References Cited

U.S. PATENT DOCUMENTS

| 1,575,950 | A | * | 3/1926 | Thorn | B60R 13/105 40/202 |
| 2,093,620 | A | * | 9/1937 | Roessler | G09F 21/04 40/209 |
| 2,135,191 | A | * | 11/1938 | McBrady | 248/316.4 |
| 3,908,296 | A | * | 9/1975 | Harrison | G09F 7/20 40/210 |
| 4,445,291 | A | * | 5/1984 | Easley | B60R 13/105 40/210 |
| 5,027,537 | A | * | 7/1991 | Freeman | B60R 13/005 40/209 |
| 5,503,420 | A | * | 4/1996 | Consiglio | B62H 1/00 280/288.4 |
| 6,526,680 | B1 | | 3/2003 | Yu | |
| 6,748,682 | B1 | * | 6/2004 | Sims | G09F 21/04 40/210 |
| 6,796,060 | B1 | * | 9/2004 | Meester | G09F 13/04 40/204 |

(Continued)

*Primary Examiner* — Bradley Duckworth
(74) *Attorney, Agent, or Firm* — Lori J. Sandman, Esq.

(57) ABSTRACT

This invention discloses a device and method for mounting and changeably displaying visual communications, including messages, logos, advertisement, public service announcements or indicia, on a vehicle. It incorporates a frame mounted on a license plate, optionally within the license plate recess at the front or rear of a vehicle, and utilizes panels that are continuous with or removeably attached to a central component framing the license plate in order to optimize visual appeal, minimize aerodynamic drag, and reduce or eliminate potential clearance issues. A removeably attachable panel configuration allows for panels to be mounted on one or both lateral sides, providing a means for customization based on a vehicle's exterior design or user preference.

5 Claims, 3 Drawing Sheets

(56) References Cited

U.S. PATENT DOCUMENTS

| | | | | |
|---|---|---|---|---|
| 6,848,204 B1* | 2/2005 | Nowak | G09F 21/04 | 40/200 |
| 6,892,483 B2* | 5/2005 | Parenti | B60R 13/105 | 40/201 |
| 6,962,013 B1* | 11/2005 | Perrin | B60R 13/105 | 40/209 |
| 7,142,104 B1* | 11/2006 | Blueford | B60Q 1/503 | 340/426.13 |
| 7,154,387 B2* | 12/2006 | Boomershine, III | B60Q 1/44 | 340/463 |
| 7,168,194 B2* | 1/2007 | Yen | B60R 13/00 | 40/209 |
| 7,225,569 B2* | 6/2007 | Pitt | G09F 15/0025 | 160/327 |
| 7,350,323 B1 | 4/2008 | Basos | | |
| 7,430,822 B1* | 10/2008 | Combs | B60R 13/10 | 40/204 |
| 7,535,343 B1* | 5/2009 | Pinckney | B60R 13/00 | 340/425.5 |
| 7,877,908 B2* | 2/2011 | Collins | B60R 13/105 | 40/200 |
| 8,291,627 B1* | 10/2012 | Spencer | B60R 13/005 | 40/209 |
| 8,533,982 B2 | 9/2013 | Rousey et al. | | |
| 8,544,198 B2* | 10/2013 | Iverson | B60R 13/105 | 40/204 |
| 8,578,640 B1* | 11/2013 | Krankkala | G09F 7/18 | 40/209 |
| 8,850,727 B2* | 10/2014 | Malina | B60R 13/105 | 40/209 |
| 9,082,327 B1* | 7/2015 | Jefferson, Jr. | B60R 13/105 | |
| 9,141,973 B2* | 9/2015 | Mendoza | G09F 21/048 | |
| 9,199,593 B2* | 12/2015 | Fritsch | B60R 19/44 | |
| 9,211,850 B2 | 12/2015 | Marko, Jr. | | |
| 9,221,406 B2* | 12/2015 | Angara | B60R 13/105 | |
| 9,270,407 B2* | 2/2016 | Dandrow | H04K 3/822 | |
| 9,283,889 B1* | 3/2016 | Baker | B60Q 1/2661 | |
| 9,315,149 B1* | 4/2016 | Fairchild | B60Q 5/00 | |
| 9,352,685 B1* | 5/2016 | Abramowitz | B60Q 1/56 | |
| 9,381,874 B2* | 7/2016 | Knapschaefer | G09F 7/18 | |

* cited by examiner

MOUNTING DEVICE AND METHOD FOR VISUAL COMMUNICATION

CROSS-REFERENCE TO RELATED APPLICATIONS

This application claims priority to U.S. patent Application No. 62/105,014, filed Jan. 19, 2015.

STATEMENT REGARDING FEDERALLY SPONSORED RESEARCH/DEVELOPMENT

Not applicable.

REFERENCE TO SEQUENCE LISTING, A TABLE, OR COMPUTER PROGRAM LISTING COMPACT DISC APPENDIX

Not applicable.

BACKGROUND OF THE INVENTION

This invention relates to mounting solutions for visual communications. More specifically, it provides a platform that facilitates dissemination of readily observable information in a spatially efficient manner to surrounding observers. It involves a device and method for mounting visual communications, including text, pictures, logos, team insignia, advertisements or other indicia, to a vehicle.

BRIEF SUMMARY OF THE INVENTION

The invention described herein comprises a mounting solution through which visual information can be placed for observers, including pedestrians, bystanders and occupants of other vehicles. The device can be placed on the front or rear of a vehicle without obscuring legally required identification information. Utilization of the device and method presented alleviates certain performance issues inherent in existing designs for vehicle-mounted information display, including but not limited to reduction of aerodynamic drag and potential height clearance issues, and improves overall aesthetic appeal.

DESCRIPTION

The present invention is directed to a method of communication that can be tailored to the individual user. It provides the ability for the user to individually select and modify messages, logos, advertisement, public service announcements or indicia. The method incorporates a device comprising a frame with panels either continuously connected or attachably and removeably mounted to the frame in a streamlined fashion in order to increase visual appeal, minimize aerodynamic drag, and reduce or eliminate potential clearance issues. It utilizes the existing front or rear space of a vehicle, and in a preferred embodiment is mounted within the license plate recess, thereby reducing force on the device from airflow around the vehicle. This placement also renders the device less obstructed and reduces potential vulnerability to environmental elements relative to currently available designs. Utilization of the device within the license plate recess also improves energy efficiency and reduces wear on the surfaces used for visual communication by minimizing or avoiding high speed impacts of small objects, such as but not limited to road debris and insects.

The device and method described also avoids potential operating issues inherently imposed on vehicle operation due to currently existing methodologies. Typical examples of current methodologies involve upright, often triangular surfaces, which are mounted vertically with respect to the plane of the road and placed on the highest surface of a vehicle. In certain circumstances, current methodologies increase the effective height of a vehicle, causing potentially unforeseen and unfortunate damage or inconvenience. This can occur particularly in scenarios which are adversely affected by adding to vehicle height, such as with placement on a truck driven through a zone with height restrictions, including but not limited to small tunnels or bridges, or when being loaded for shipping. Damage to the present invention would, in most cases, require a much more localized and violent event to compromise the integrity of the device.

The present invention is also superior to methodologies involving communications utilizing the surface of rear or side facing glass, as these methodologies potentially limit and obscure the visual field of the operator. It also provides advantages over methodologies involving affixing indicia to a bumper, such as bumper stickers or magnets, in that it is higher in the visual field of observers, and less susceptible to damage. Furthermore, positioning of the invention around the license plate within the recess protects it from visual obstruction.

Another meaningful benefit of this device and method involves taking advantage of common regulations regarding existing vehicle identification mounting. In virtually all instances, governing bodies, at minimum, require placement of identification information unique to each vehicle to the rear and in plain view. Such requirements and the desire to prevent possible theft or misuse of said identifying information have led vehicle manufacturers to provide rather robust "hard points" on which to mount such identification. No such comparable points are commonly located in positions where current methodologies are typically placed. In utilizing this mounting solution, an element of security and reliability is introduced.

The mounting solution disclosed herein incorporates panels and a frame anchored to the front or rear of a vehicle. In a preferred embodiment, the frame surrounds the vehicle's license plate, and incorporates readable text, images, designs or other indicia printed on the frame's panels. These panels have sufficient surface area to communicate with potential bystanders or occupants of other vehicles without adversely affecting the operational capability of any reasonably expected systems utilized by a vehicle during normal operation. The frame and panels incorporate sufficiently rigid, rugged material to allow the invention to withstand typical wear and tear suffered during regular use while not presenting any foreseeable additional hazard or issue in the event of a collision. The panels may be removeably attached to the frame or continuously incorporated onto the frame directly. Means of removeably attaching the panels to the frame include, but are not limited to, spreadable clip fasteners, slides, or hooks; one skilled in the art would recognize that a variety of attachment or connection methods could be used and would be consistent with the specification herein.

The invention further contemplates utilization of a more sophisticated communication delivery system incorporating electronic methods of display, including but not limited to technologies using powered screens controlled by integrated circuitry, digital circuitry, or other means. These technologies offer an opportunity for application of more sophisticated and dynamic messaging while preserving the essence of the mounting location and rationale for placement. Such geometrically similar systems would be capable of utilizing the same core mounting hardware without need for significant additional modification.

DESCRIPTION OF THE REFERENCE NUMBERS AND LETTERS 10 communication surface
15 releaseable attachment means
20 attachment apertures
30 central component
40 communications surface attachment point
50 central component attachment point

DETAILED DESCRIPTION

The invention disclosed comprises a central component 30 consisting of a frame fitted to surround a license plate. One or more panels incorporate one or more communication surfaces 10; the panels are either continuous with, or releaseably attached to one or more sides of the central component 30. The communication surface or surfaces 10 provide an area for removeable or changeable placement of messages, logos, advertisement, public service announcements or indicia. The central component's frame includes attachment apertures for mounting the device on a vehicle. Since vehicles often contain built in "hard points" for attachment of license plates, the frame can be attached utilizing the existing license plate attachment means at the vehicle and license plate interface as more fully described below.

Figure 1:
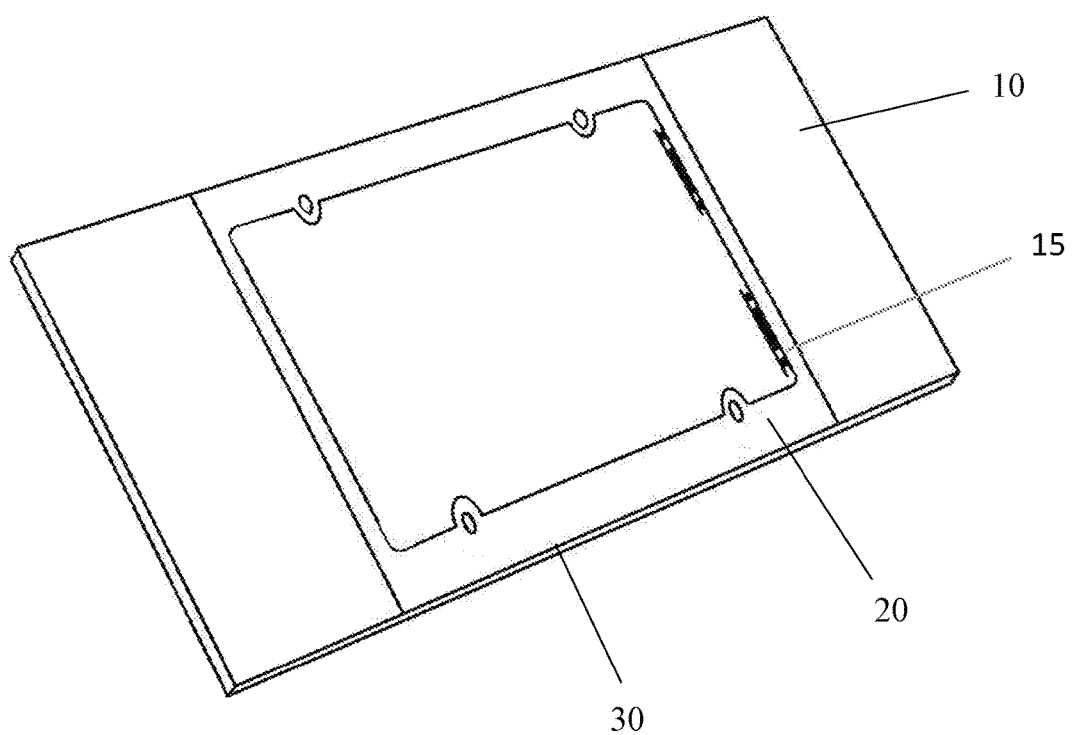
FIG. 1 depicts a perspective view of a preferred embodiment of the invention.

A perspective view of a preferred embodiment of the device is shown in FIG. 1, illustrating several features, including a central component 30, which facilitates direct attachment to a vehicle and license plate interface, potentially at the vehicle's "hard points" if present, for durability and support. The central component 30 includes attachment apertures 20 through which threaded, spreading or similarly functioning attachment components can be screwed or otherwise driven into the front or rear identification mounting locations, effectively and securely positioning and anchoring the central component 30 to a vehicle. One or more attachable, and optionally removable panels form the communication surfaces 10 onto which visual communications can be deployed. The central component 30 and panels including the communication surface or surfaces 10 may be continuous with each other, or in another embodiment removeably connected at one or more communications surface attachment points 40. In the removeable embodiment, the panels of the communication surface or surfaces 10 are connected by a releasable attachment means 15 connecting the central component and the panel. This attachment means can comprise a hinge, hook, slide, clips, clasps, screws or binding capable of releaseably connecting with and joining said central component with said communication surface or surfaces.

Figure 2:
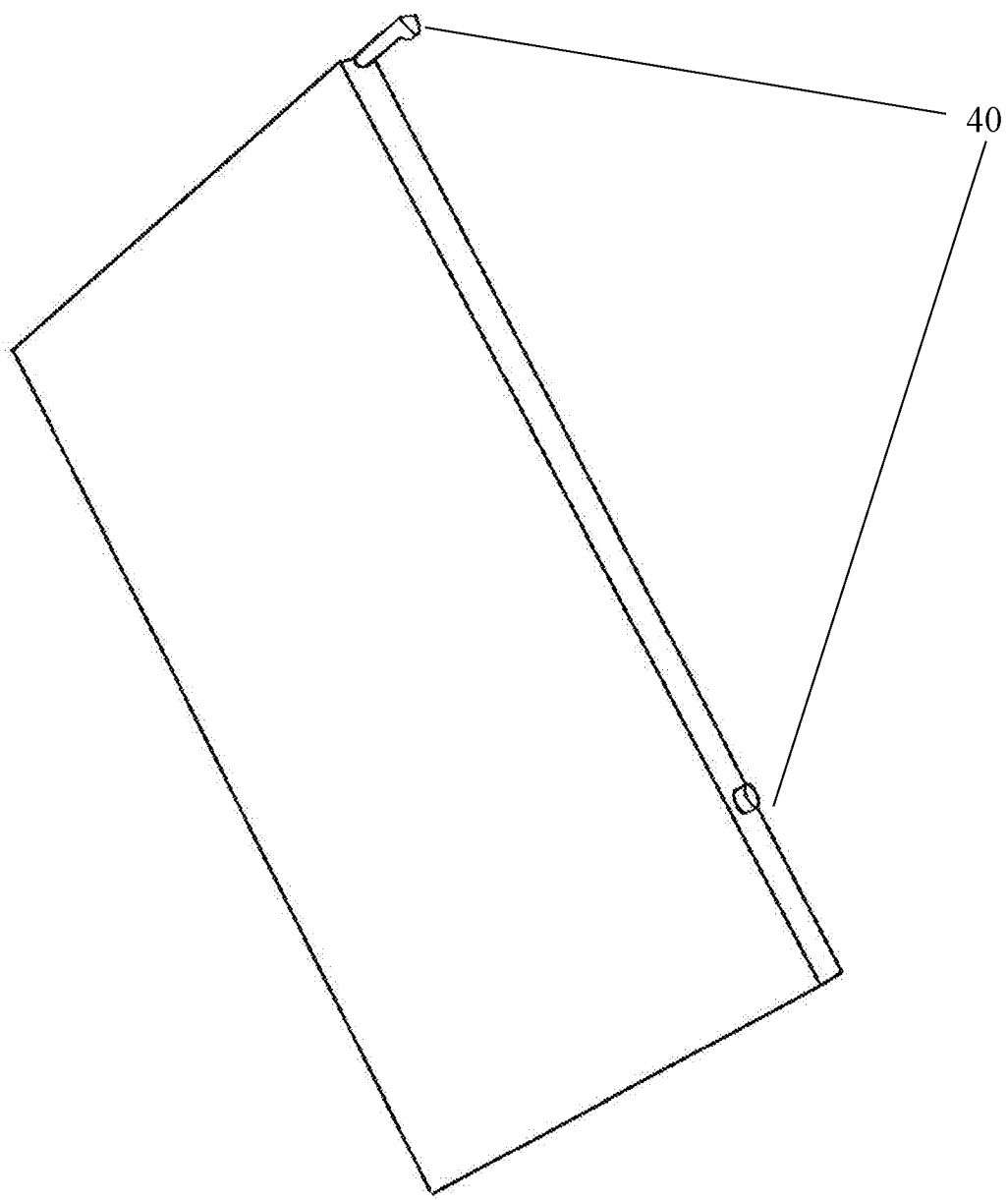
FIG. 2 depicts a perspective view of the panel including the communications surface and an embodiment of a hook and insert means of attachment.
Figure 3:
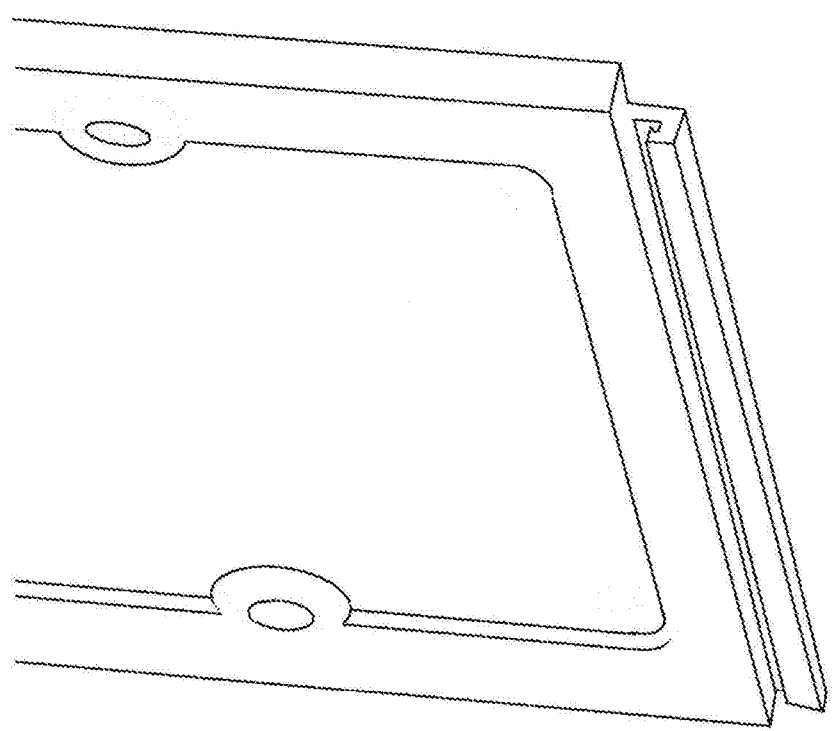
FIG. 3 depicts a perspective view of the central component of the frame and a different embodiment of the device including a slide means for attachment of the panels to the side of the frame.

The designs depicted in FIG. 2 and FIG. 3 illustrate two possible means by which the panel bearing the communication surface 10 and the central component 30 mechanically interface through precise fitment. In FIG. 2, a hook and insert means of attachment are shown, with this particular embodiment of communication surface attachment points 40 depicted. FIG. 3 details an embodiment of the central component attachment point 50; in this depiction, a slide means of attachment is shown. Here, the panel and communication surface 10 is slideably attached to the central panel by a ridge and channel configuration that would matingly conform to a ridge and channel on the central component. Further contemplated embodiments not shown in the drawings include a tile that can slide into the panel through a slotted opening, or be pressed into or onto a framed panel surface. One skilled in the art would recognize that attachment of the panel to the central component 30 could be achieved by other means not inconsistent with this specification.

The device provides a communication surface or surfaces in order to deploy communications in the form of messages, logos, advertisement, public service announcements or indicia by their placement upon said communication surface or surfaces 10 when mounted upon a vehicle. The placement itself can be removeable or fixed. In the removeable embodiment, removeable placement is accomplished through use of a preprinted tile that can slide into the panel through a slotted opening, or be pressed into or onto a framed panel surface. Magnets are also contemplated for use with appropriate panel materials. In this way, messages or other indicia can be easily changed by the user. In the fixed embodiment, fixed placement is accomplished by gluing, sticking, fusing or adhering preprinted messages onto the communication surface or surfaces 10, or by printing directly logos, advertisement, public service announcements or indicia onto the communication surface 10. The fixed placement can be made of materials such as laminates or decals to impart a flat surface or materials can include raised lettering or three-dimensional images upon the communication surface.

Vehicles as contemplated in this invention include cars, buses, trucks, taxis, limousines, bicycles, drones, boats, trains, planes, or other navigable craft as defined by federal regulation as a vehicle.

The visual communication device presented is also capable of technical expansion to include illumination. More specifically, the communication surface, the central component, or both, are capable of being lighted. It is contemplated that LED strips or other lighting could be incorporated by attachment to the frame and removeable panels of the invention.

While the description above discloses preferred embodiments of the present invention, it is contemplated that numerous variations and modifications of the invention are possible and are considered to be within the scope of the claims that follow.

I claim:

1. A visual communication device comprising a central component including a frame that surrounds a license plate; one or more removable and releaseably attached panels extending laterally from and removable and releaseably attached to one or more sides of said central component with spreadable clip fasteners, slides or hooks; said removable and releaseably attached panels further comprise one or more communication surfaces that can be independently ornamented with changeable messages, logos, advertisement, public service announcements or indicia selected by the user; the central component comprising attachment apertures which are configured to align with apertures in vehicle hard points located within a vehicle license plate recess; and one or more attachment components capable of passing through the attachment apertures and vehicle hard point apertures for securely and removeably mounting the device on the front or rear license plate recess.

2. The visual communication device of claim 1 wherein the communication surface or surfaces are generally coplanar relative to the plane of the central component, and deploy communications in the form of messages, logos, advertisement, public service announcements or indicia by their placement upon said communication surface or surfaces when mounted upon a vehicle; said placement upon said communication surface or surfaces can be removeable or fixed.

3. The visual communication device of claim 1 wherein the one or more panels further comprise logos, advertisement, public service announcements or indicia directly printed onto said one or more panels, or attached to the panels as preprinted laminates, stickers or decals.

4. The visual communication device of claim 1 wherein the communication surface is magnetic and said device further comprises ornamented or printed magnets removeably attached to said communication surface.

5. A method for visual communication comprising the steps of:
  i. preprinting messages, logos, advertisement, public service announcements or indicia on laminates, stickers, decals or magnets, or directly upon a visual communication surface;
  ii. attaching said messages, logos, advertisement, public service announcements or indicia to one or more removeable and releaseably attached panels of the communication surface or surfaces, wherein said panels are removeable and releasably attached with spreadable clip fasteners, slides or hooks;
  iii. attaching said panels to a central component capable of attachment to an display of said communication surfaces with said spreadable clip fasteners, slides or hooks;
  iv. mounting the central component and attached panels around a license plate of a vehicle by attaching it through existing license plate attachments at vehicle hard points used for attachment of the license plate;
  v. removing, modifying or replacing said messages, logos, advertisement, public service announcements or indicia to change based on user input and desired communication;
  vi. optionally attaching or incorporating LED lighting to the device.

\* \* \* \* \*